June 9, 1931.   J. M. WILLARD   1,808,912
ART OF AND MEANS FOR MOLDING CONCRETE STRUCTURES
Filed July 7, 1928   2 Sheets-Sheet 1
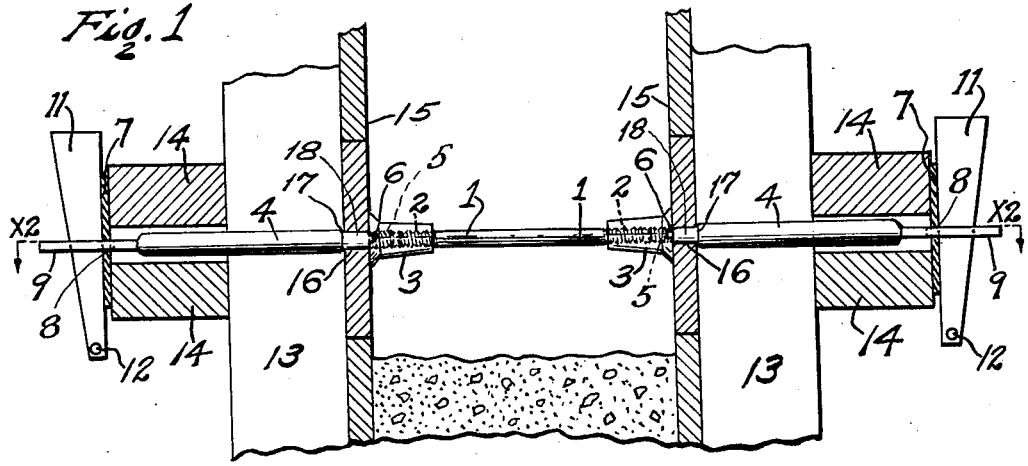
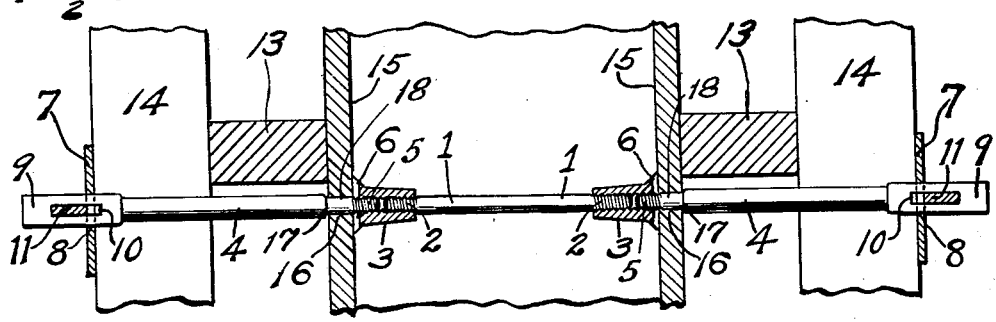
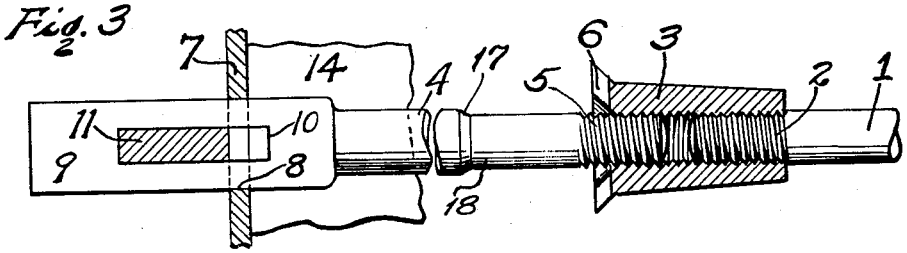
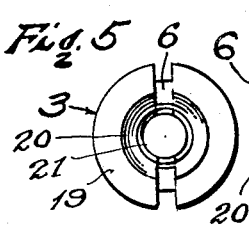 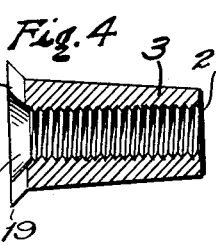 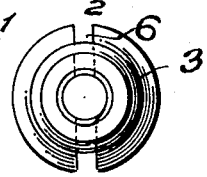
INVENTOR
JOHN MELVILLE WILLARD
WITNESS:
John A. McDowell June 9, 1931. J. M. WILLARD 1,808,912
ART OF AND MEANS FOR MOLDING CONCRETE STRUCTURES
Filed July 7, 1928 2 Sheets-Sheet 2
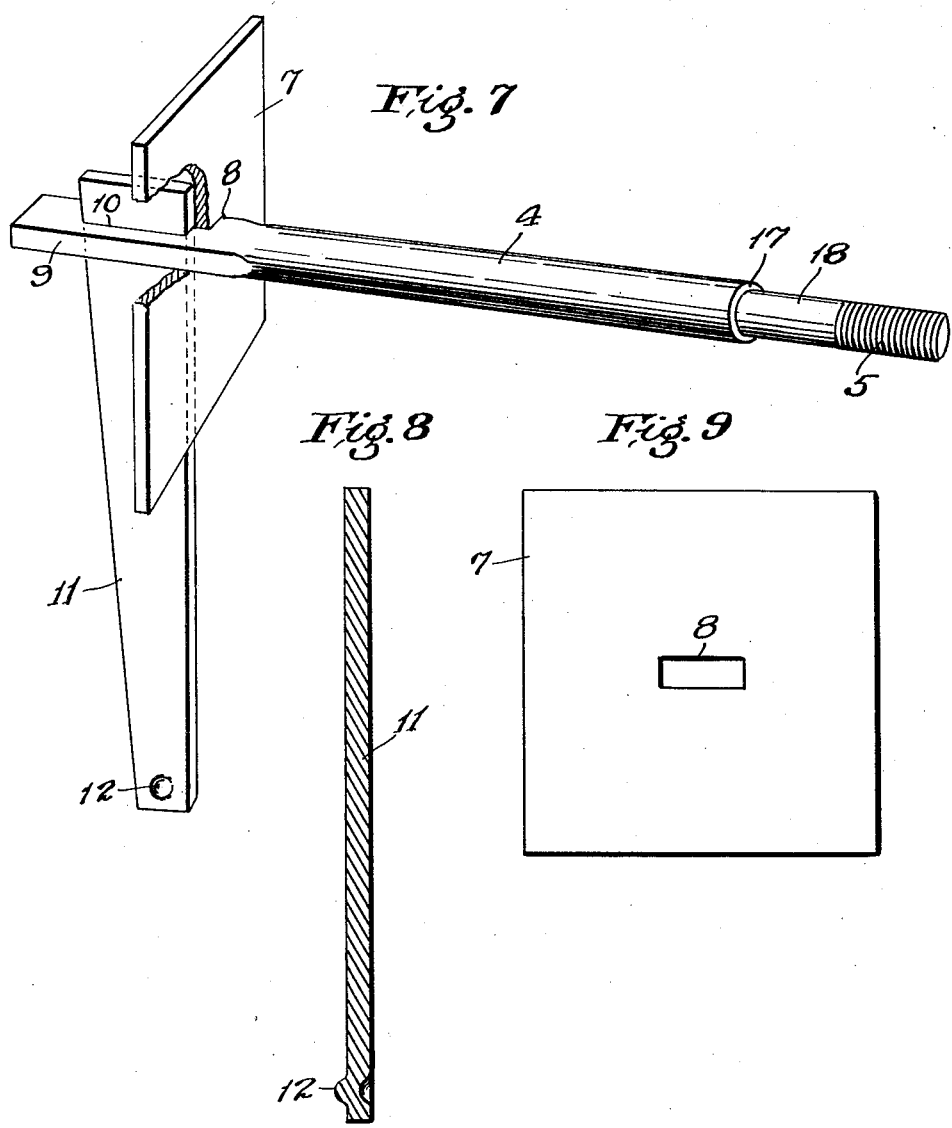
Witness
C. H. Whitmore
Inventor
John Melville Willard
by James R. Townsend
his atty Patented June 9, 1931

1,808,912

UNITED STATES PATENT OFFICE

JOHN MELVILLE WILLARD, OF LOS ANGELES, CALIFORNIA

ART OF AND MEANS FOR MOLDING CONCRETE STRUCTURES

Application filed July 7, 1928. Serial No. 290,983.

This invention relates to improvements in the means for and the methods of establishing and removing knock-down structures adapted to form temporary molds for concrete walls and like bodies, and includes a wall molder's equipment, parts, a builder's assembly of parts, and certain combinations of parts and assemblies, and a method of using the same as will hereinafter more fully appear.

In the art of molding concrete bodies or structures such as piers, abutments, sewers, walls of buildings and the like, above or below ground, it is customary to make knock-down molds of timber and to provide means to space apart the sides of such structures and to hold them from spreading apart, such means comprising tie rods, nuts on the ends of the tie rods to contact with the inner sides of the walls of the molds; tension rods, and removable means in conjunction with the tension rods, tie rods and nuts, to hold the walls of the mold structure in true position until the concrete has set, and then to remove such means and the walls and then to remove the nuts from the concrete and to close with cement the holes left by the removal of the nuts.

An object of this invention is to facilitate the application and removal of the tension rods and the nuts.

The removable parts heretofore employed consist of wires, nuts, keys and bolts, or the like, and in practise, heretofore, a considerable expense has resulted through the loss of time by the workmen through the handling of small parts that are used in connection with the tie-rod and the temporary mold structure, to hold the parts of such structure in set-up position; and an object of this invention is to avoid such loss; and this object I attain by providing a conveniently handled mold builder's assembly for use in connection with the tie-rod in forming the mold structure, the same being adapted for ready removal from the embedded tie-rod when the mold structure is to be knocked down and removed.

In this invention I have provided a builder's assembly that comprises a tension clamp- rod outer section having a threaded end to engage a coupling nut, and having a flattened and slotted end, a slotted washer plate slidable on the flattened end, and a wedge key inserted through the slot of the flattened end of the tension clamp, rod section, and too large at its wider end to pass through the slot of the rod section and having a stop at its smaller end to prevent withdrawal from such slot, so that the workmen can handle the appliance as a unit, inserting the rod section through a wall of the mold structure and screwing the rod into and out of the coupling nut of the tie-rod, using the wedge as a handle to turn the tension rod until such rod is screwed home into the nut; and vice versa, using the wedge as a handle to unscrew the rod in taking down the form.

An object is to provide means by which, in the building of the wall, perfect and rapid work can be done on both the outside and the inside of the walls without fumbling small parts, there being but two specimens of assembly devices to be handled.

An object is to enable the workmen to automatically select, place and secure the tension rod or bolt and its appurtenances with a minimum amount of thought or mental application, and to speed up the work and make it practically fool proof.

I have also provided a conical coupling nut or sleeve having its conical exterior concentric to a threaded axial bore that is adapted to be screwed onto the central tie-rod section and is adapted to receive the threaded end of a clamp rod. Said cone, nut or sleeve as shown in the drawings, is lathe-turned externally to practically perfect smoothness and is provided at its larger end with a wrench seat to receive a tool by which it may be turned in the concrete after the concrete has set, so that the threads on the end of the embedded tie-rod section may serve to cause the internally threaded cone sleeve to unseat the cone nut from the concrete as the sleeve is turned to unscrew it from the tie-rod; and the seat for such tool is a kerf adapted to receive the edge of a screw driver or like tool so that the workmen may remove the cones from the set concrete by means of a carpenter's brace and screw driver bit. Other forms of wrench seats may be employed without departing from the spirit of this invention.

I also provide the large ends of the cone nuts with conical counter bores to guide the tension rods into the threaded seats therefor.

The cone is internally and concentrically threaded, chamfered at its larger end to guide the outer section of the clamp rod when such outer section is inserted through the temporary mold wall with a view toward screwing such threaded end into the cone sleeve, preparatory to establishing the mold structure.

An object is to provide for accurately spacing apart the facings of the mold and to clamp said facings firmly against the uprights and to force together the horizontal and vertical members of each wall of the mold, with less loss of time and with cheaper labor than heretofore.

The invention is broadly new, basic and pioneer with respect to the construction and arrangement of the builder's assembly and to the various parts and details of a construction which will hereinafter be more fully set forth.

Another object is to provide simple and certain accurate means for gaging the width of the mold space and to this end I provide tie rods, tension rods and conical sleeve nuts of predetermined lengths and locations of threads so that when the nuts are screwed home on the tie rods to form spacers, all the spacers thus made will be of equal length and if it is desired to space the mold walls closer together or further apart, shorter or longer tie rods will be used; the threading at the ends of all tie rods of one length being uniform so that the work of assembling the spacers for exact thickness of the concrete body may be done at the bench or elsewhere, by unskilled workmen, thus to cheapen the cost of building concrete structures.

An advantage of this invention is that it enables a single workman to erect a mold structure without assistance from other workmen.

A further advantage is that by this invention it becomes possible for two workmen to erect the mold structure at a great saving of time over that required by such two workmen using appliances heretofore known for such purposes.

Another advantage is that with this invention, complete salvage of mold forming material is possible.

Other objects, advantages and features of invention may appear from the accompanying drawings, the subjoined detailed description and the appended claims.

The accompanying drawings illustrate the invention.

Figure 1 is an elevation of a device embodying this invention in use, with the upright studs, the horizontal wales and the facings of a mold for a concrete wall; the studs are shown fragmentally, and the wedge plates, wales and siding, and a partial pouring of concrete are shown in vertical section.

Fig. 2 is a fragmental plan of what is shown in Fig. 1, the wedge plates, wedges, cone sleeve nuts, and the facings and studs being in section on line indicated at $x2$—$x2$, Fig. 1.

Fig. 3 is an enlarged fragmental detail showing a terminal or tension rod in place above a fragment of one of the wales of the mold, and a fragment of the tie rod with the cone sleeve nuts attached to the tension rod.

Fig. 4 is an enlarged axial section of one of the cone sleeve nuts.

Fig. 5 is a face view of the larger end of such cone sleeve nut.

Fig. 6 is a view of the smaller end of such nut.

Fig. 7 is a perspective view of the mold-builder's assembly broken for clearness of illustration.

Fig. 8 is a mid-section of one of the keys.

Fig. 9 is a face view of one of the key plates.

The central tie rod or spacer sections 1 have threaded terminals 2 of predetermined length on which are screwed home the smaller ends of cone sleeves or nuts 3 forming couplings of predetermined length. Each tension rod section 4 has a threaded end 5 adapted to be screwed into and out of the larger end of the cone nut or coupling 3 which is provided at such larger end with means to be engaged by a tool for turning the cone to screw or unscrew it onto or from the tie rod section. Such means may be a wrench seat, in the form of a slot as at 6 to receive a screw driver bit not shown, operable by a carpenter's brace not shown.

7 is a key plate or washer provided with a diametrical slot 8 through which a flattened portion 9 of the tension rod or terminal member 4 is passed. Said flattened partion 9 is provided with a slot 10 through which is passed a wedge key 11 that is constructed and arranged to have a limited endwise movement in the slot 10, the length of which slot is less than the width of the larger end of the wedge key 11 so that a key inserted into the slot can not pass entirely through; and the smaller end of the key is provided with a stop 12 which is shown in the drawings as a punch imprint stud formed by forcing out on one side of the key a portion of the smaller end of the key by a punch after the key has been inserted through the slot 10; so that the key can not fall out or be withdrawn from the slot, and the washer can not be removed. In this way I have produced a new manufacture or part to be used in establishing concrete molds, the same constituting a mold builder's assembly as a unit for connection with the spacer to clamp the mold siding onto the spacer, and to the studding and wales.

In practise spacers of predetermined length of nuts, rods and threaded portions are formed at the bench or elsewhere by fitting the tie rod with two sleeve nuts 3 screwed onto the ends of the tie rod, so that the spacers are brought to a length exactly equal to the width desired between the facings of the mold and the nuts have threaded openings to receive the threaded ends of the tension members.

The customary mold is a wooden structure having two walls spaced apart to receive concrete between them and such walls consist of upright studding or studs as at 13, pairs of horizontal wales as at 14 outside the studs and facings as at 15, secured by nails not shown to the inner faces of the studs, and the walls are spaced apart and secured together by spacing and tension devices, holes as at 16 being provided in the facings through which to insert the tension rods; for engagement with the spacing means.

In this invention, in order to provide a gage that will insure a uniform thickness of wall, the threaded portions 2 of the central rod sections are of less length than the threaded bores of the cones, and are spaced apart a predetermined distance and the cones are of such predetermined length that when the cones are screwed home on the central rod, sections, the space between the terminal faces of the larger ends of the cones will be exactly equal to the desired thickness of the concrete wall.

The tension rods 4 are shown reduced to form shoulders 17 and provide smooth portions 18 which are preferably of the same diameter as the threaded terminals of the rod; and the holes in the facings are of like diameter so that when a tension rod is screwed home as shown in Fig. 2, the shoulder 17 will force the facing 15 against the cone nut, thus insuring that the facings are properly spaced apart.

The diameter of the body of the tension rod 4 is greater than the width of the slot 8 in the washer or key plate 7 so that when the tension rod, key plate, and wedge key are assembled as shown and the stud 12 is punched out, the assembly is inseparable and adapted to be handled by careless workmen without loss of the small parts.

In the present practise it is considered necessary, in order to secure the best results, that the mold shall be of a considerable height so that the concrete may be poured as continuously as possible from base to top of the wall without stopping to add to the height of the mold; and the tie rods, including the spacers and tension means are applied at approved intervals within the judgment of the constructor.

In constructing a mold I bore through the facings 15, holes 16 in alinement with each other, place the spacers in alinement with the holes and then pass the threaded end of the tension rods 4 between the wales and through the holes and into the conical counter bore in the large ends of the cone nuts which guides the rod ends into the threaded holes of the nuts and said bolts are then screwed home. This may be readily done by using the keys as handles or levers; and when the terminal sections or tension rods have been screwed home, the wedging keys are driven home in their slots to contact with the key plates 7 to force them against the wales 14, and to press the wall facing tightly against the stops formed by the outer ends of the cone nuts.

When the mold structure has thus been established, the concrete will be poured, filling the space between the walls, and enveloping the spacers including the rod 1 and the cones thereon.

When the concrete has fully set, the wedge keys 11 may be driven up to bring their smaller ends to the slots whereupon the keys may be used as handles to unscrew the terminals from the cones. Then the mold structure will be knocked down and removed, thus exposing the ends of the cones, which are then turned by a proper tool to unscrew them from the embedded rod section.

Then the holes left in the concrete by removal of the nuts may be filled with cement.

In order to insure perfect work with minimum cost of time and labor in removing the nuts they are machined or lathe turned and the bore and periphery are truly coaxial, or concentric throughout.

It is understood that the invention is not limited to the use of round rods for the spreader and tension members as it is only necessary for such members to leave sufficient cylindricity to be threaded to the nuts. The forms of the members shown in the drawings are at present deemed preferable for the purposes set forth.

By this arrangement of the tie rod threaded terminal screwed home in the small end of the nut, leaving a threaded opening in the large end of the nut to accommodate the threaded terminal of the tension member and the shoulder spaced to clamp the mold facing before the two terminals come together, the work of inspection is minimized for the reason that an unskilled workman will readily learn that he is required to screw the tension rod into place until it comes to the dead stop caused by the shoulder forcing the facing against the spacer.

The threading of the spacer rod 4 is sufficient to afford the requisite strength of joint between the tie rod and the taper nut and yet to leave a threaded opening to seat the tension rod at the larger end of the nut when the smaller end is screwed home on the tie rod, and such opening is deep enough to accommodate such variations in thickness of the facings as are likely to occur.

The threads on the spacer rod are so gaged in their position that when the nuts or couplings are screwed on to each end clear to the heels of the threads, the rod and nuts will form a predetermined gage exactly equal in length to the thickness of the body to be molded.

By making the cones exteriorly smooth and threading them onto the spacer rod sections, the moment they are started to unscrew from the said sections, the cones are freed from the concrete and are easily withdrawn from the molded structure. In this manner the cones and the assemblies are at once again ready for use with other spacers without serious inconvenience or loss of time.

I have provided the spacer nuts with conical flanges 19 so that the margins of the prints in the concrete will be smooth and unbroken when the nuts are withdrawn. The divisional application is relied upon to retain my rights to this novelty.

The large end of the taper concrete mold spacer nut is provided with an inwardly diminishing center counter bore 20 to guide the threaded end of the tension rod into the threaded bore 21 of the nut, thus to facilitate assembling the parts of the clamp as the tension rod is projected beyond the mold facing for the purpose of screwing it into the nut on the spacer rod.

The spacer rods 1 are shown externally smooth between cut-in threads 2, and in case the concrete wall is fairly thin it is only necessary to unscrew one of the cones from the spacer rod; as said rod, with the other cone attached, can then be driven out through the wall so that expense of time and labor for unscrewing and replacing more than one of the nuts for each spacer rod is eliminated; and the rod with both spacer nuts may be reused again and again, thus greatly reducing the investment required of the contractor; and furthermore, the cost of building the walls is greatly reduced.

Where the mold is to be erected by a lone workman, such workman will erect the studding for one side wall of the mold and will lightly nail thereto sheathing boards to form the inner face of that wall of the mold. When the first side wall of the mold is thus erected, the workman will bore holes for the tension rods in horizontal rows at appropriate spacing apart and then will go to the outer side of the wall, and picking up the wedge bolts, one at a time by their tension rods 4, will insert the threaded ends of such rods through the holes he has bored in the sheathing and will leave the tension rods hanging in the holes so that only the threaded parts of such rods extend from the inner side of the wall.

Then the workman passes along the mold side of the wall and screws onto the projecting threaded ends of the bolts, the equal length spacers previously provided as described above.

When all the spacers have thus been screwed home onto the threaded ends of the wedge bolts of the first mold side, the workman will go to the other side of the mold wall thus set up, and will place a wale 13 on a horizontal line of tension rods of the wedge bolts and will then lift a second wale into place under such line of wedge bolts, and will then turn the wedges to bring their large ends up, and will then drive them down in the slots of the tension rods, thus wedging the washer plates tight against the wales and drawing the couplings tight against the inside face of the sheathing; thus bringing the spacers into rigid horizontal position, and securely bracing the facing of the molds to the wales through the studs. When all the wales on this side of the mold have been placed and the tension member wedges driven home, this side of the form is complete and the workman starts the opposite side. On this opposite side only two studs need be first erected, and preferably they will be placed wide apart; and the sheathing or facing of the mold will be placed, one board at a time and nailed to these two studs only. When the sheathing so placed rises until a board is opposite the first line of spacers extending from the opposite side of the mold, the workman will bore holes in this board opposite to the threaded sockets in the ends of the spacers; and threaded tension rods are inserted through the sheathing and screwed into the cone nuts, the loose wedges being used for handles. The erection of the rest of the second side of the mold structure is continued, board at a time, the tension members being inserted as the wall rises, thus connecting together the sheathing of the two walls. When the sheathing of this second side is all in place, additional studs are placed against the outside of the sheathing of this second side and are nailed to the sheathing only at the top and bottom, simply to hold the studding in position until the wales are clamped in place. The wales on this side are then placed and locked up in a manner identical to that employed on the first side. Then all the wedges are driven tightly home, and the mold is ready to receive the concrete.

Where two workmen are on the job, an advantage may arise from the facility with which the long wales are handled.

I claim:—

1. In a concrete wall molding equipment comprising studding and sheathing for forming the sides of the mold, together with spacers having threaded sockets at their ends and adapted for engaging the sheathing to hold the mold walls apart, said threaded sockets being adapted to receive threaded ends of tension bolts; a workman's assembly comprising a tension bolt, one end of which is threaded to screw into said sockets respectively, and the other end of which bolt is flattened and provided with a slot extending longitudinally along the bolt; a bearing plate slotted to fit upon the slotted end of the bolt and a wedge slidable through the slot in the bolt to wedge the plate toward the threaded end of the bolt and non-removably secured in the slot of such bolt.

2. The wedge bolt set forth comprising a rod screw-threaded at one end and flattened and slotted at the other end; a slotted plate on, and slidable along the flattened portion of the rod only; and a wedge non-removably mounted in the slot of the rod and adapted to wedge the plate toward the threaded end of the rod.

3. In a concrete wall molding equipment comprising studding and sheathing for forming the side walls of a mold, together with clamp members for engaging the outer sides of the studding, and spacers having at their ends threaded tension bolt engaging enlargements having screw-threaded tension bolt receiving sockets and adapted for engagement with the inner faces of the sheathing to hold the mold walls apart; there being holes in the sheathing to allow tension bolts to extend therethrough; workman's assemblies, each comprising tension bolts adapted to extend through said holes, each of said bolts having one end threaded and adapted to be inserted through the holes in the sheathing for engagement with said sockets respectively, and the other ends of said bolts being flattened and each provided with a slot that extends lengthwise of the bolt, washer plates slotted to fit upon, and slidably fitted on the slotted ends of the bolts, and wedges slidable through and non-removable from the slots in the bolts and whereby the plates may be wedged by the wedges toward the threaded ends of the bolt so that when the sheathing and studding for a side wall of the mold are assembled, the workman can directly insert the bolts into the holes therefor without fumbling the parts of the assembly; the spacers being of uniform length from socketed face to socketed face so that the spacers may be taken as units and screwed home on their bolts without fumbling, and whereby automatic exact spacing of the walls apart can be effected speedily without possibility of irregular spacing.

4. In a concrete wall molding equipment comprising studding and sheathing for forming the side walls of the mold, together with clamp members for engaging the outer sides of the studding and spacers having at their ends, threaded tension bolt engagement enlargements having sockets adapted for engagement with the inner sides of the sheathing to hold the mold walls apart; a workman's assembly comprising a tension bolt, one end of which is threaded to screw into any of said sockets therefor and the other end of which bolt is flattened and provided with a slot that extends lengthwise of the bolt; a washer plate slotted to fit upon the slotted end of the bolt; and a wedge slidable through and non-removable from the slot in the bolt, and by which the plate may be wedged toward the threaded end of the bolt to thrust said clamp members into engagement with the studding and force such enlargements against the inner face of the sheathing.

5. In a device for setting and holding concrete forms, the combination of a tension bar provided with a threaded end portion and a flat rectangular end portion, a slot in said flat end portion, a key plate slidably carried on said flat end portion, and a wedge inseparably but movably carried in said slot and adapted to bear against said key plate, said key plate being carried by said tension bar betwen said wedge and threaded end.

6. In a device for setting and holding concrete forms, the combination of a tension bar provided with a threaded end portion, and a flat rectangular end portion, a longitudinally directed slot in said flat end portion, a bearing plate movably carried on said flat end portion and longitudinally movable thereon, and a wedge inseparably but movably carried in said slot and adapted to bear against said bearing plate, said bearing plate being slidably carried by said tension bar between said wedge and threaded end of said bar.

7. In a device for setting and holding concrete forms, the combination of a tension bar provided with a threaded end portion and a flat rectangular end portion, a longitudinally directed slot in said flat end portion, a bearing plate carried on said flat end portion and longitudinally movable thereon, said bearing plate being provided with a slot adapted to receive said flat end portion, a wedge inseparably but movably carried in said slot and adapted to bear against said bearing plate, said bearing plate being carried by said tension bar between said wedge and threaded end, and stop means for limiting the motion of said bearing plate toward said threaded end.

8. In a device of the character described, the combination of a tension bar provided with a flat end portion of rectangular cross section, a longitudinally directed slot in said flat end portion, a bearing plate movably carried on said flat end portion, a wedge slidably received in said slot and adapted to bear against said bearing plate, said wedge being provided with means in the narrow portion of said wedge for retaining said wedge in the slot, and means carried by said bar for limiting the motion of said bearing plate away from said slot and wedge, whereby said wedge is inseparably carried by said bar in operable relation to said bearing plate.

9. A spacer for concrete forms, comprising a pair of internally threaded conical members, the large ends of each conical member being provided with a transverse slot and a conical bore leading to the axial internally threaded portion, in combination with a spacer bar exteriorly threaded at each end for a distance less than the length of the internally threaded bore of each conical member, whereby said conical members may be threadedly secured to said spacer bar with the large ends thereof away from said bar and form a spacer of a predetermined length for concrete forms.

10. A spacer for concrete forms comprising a pair of internally threaded and exteriorly smooth conical members, the large ends of each conical member being provided with a transverse slot and a conical bore leading to the axial internally threaded portion, in combination with a spacer bar exteriorly threaded at each end for a distance less than the length of the internally threaded bore of each conical member, whereby said conical members may be threadedly secured to said spacer bar with the large ends thereof away from said bar, and form a spacer for concrete forms of a fixed minimum length predetermined by the length of the spacer bar between threaded ends thereof.

In testimony whereof, I have hereunto set my hand at Los Angeles, California, this 28th day of June, 1928.

JOHN MELVILLE WILLARD.